United States Patent [19]
Murphy et al.

[11] Patent Number: 5,953,917
[45] Date of Patent: Sep. 21, 1999

[54] THERMO-VOLUMETRIC MOTOR

[75] Inventors: Peter Lawrence Murphy, Claremont; Terry Howard Solomon, Guildford, both of Australia

[73] Assignee: Thermal Energy Accumlator Products Pty Ltd, Osborne Park, Australia

[21] Appl. No.: 08/817,070

[22] PCT Filed: Oct. 4, 1995

[86] PCT No.: PCT/AU95/00655

§ 371 Date: May 15, 1997

§ 102(e) Date: May 15, 1997

[87] PCT Pub. No.: WO96/10696

PCT Pub. Date: Apr. 11, 1996

[30] Foreign Application Priority Data

Oct. 4, 1994 [AU] Australia .............................. PM8599

[51] Int. Cl.$^6$ ................................................. B60K 16/00
[52] U.S. Cl. ...................................... 60/641.8; 60/641.15
[58] Field of Search .............................. 60/641.8, 641.15

[56] References Cited

U.S. PATENT DOCUMENTS

| | | | |
|---|---|---|---|
| 3,152,442 | 10/1964 | Rowekamp ............................ | 60/641.8 |
| 3,903,699 | 9/1975 | Davis . | |
| 3,952,519 | 4/1976 | Watson . | |
| 4,079,591 | 3/1978 | Derby et al. ........................... | 60/641.8 |
| 4,283,914 | 8/1981 | Allen . | |
| 4,409,961 | 10/1983 | O'Hare .............................. | 60/641.8 X |
| 4,768,345 | 9/1988 | Kardas ................................... | 60/641.8 |
| 4,945,731 | 8/1990 | Parker et al. . | |
| 5,551,237 | 9/1996 | Johnson ................................. | 60/641.8 |

FOREIGN PATENT DOCUMENTS 2104155 3/1983 United Kingdom .
79/01003 11/1979 WIPO .

OTHER PUBLICATIONS

Patent Abstracts of Japan, M–177, p. 86, JP 57–146067 A(Kogyo Gijutsuin) Sep. 9, 1982; whole abstract.
Patent Abstracts of Japan, M327, p. 139, JP 59–96487 A (Tadao Ikejiri) Jun. 2, 1984.

*Primary Examiner*—Hoang Nguyen
*Attorney, Agent, or Firm*—Larson & Taylor

[57] ABSTRACT

A thermo-volumetric motor (10) includes a continuous incompressible fluid path in the form of a hydraulic oil path (12), a continuous compressible fluid path in the form of a refrigerant path (14), and a solar collector (18). The solar collector (18) is adapted to absorb heat from a heat source, in this example, sunlight. The hydraulic oil path (12) includes a pressure transfer mechanism, in this example a pair of hydraulic cylinders (20A, 20B) located in a parallel flow arrangement. The oil path (12) further comprises an actuating device, in this example a hydraulic loader (22), in fluid communication with a first heat exchanger (24). The refrigerant path (14) comprises a pump (28) operatively coupled to the hydraulic motor (22), and a heat transfer device, in this example a second heat exchanger (25). The refrigerant path (14) further comprises a cooling unit, in this example a first accumulator or condenser (32), used for cooling the refrigerant. The second heat exchanger (25) comprises a shell and tube arrangement wherein refrigerant is passed through a helical tube, and a first phase change substance, such as sodium acetate trihydrate, is contained within the shell.

28 Claims, 1 Drawing Sheet

THERMO-VOLUMETRIC MOTOR

FIELD OF THE INVENTION

The present invention relates generally to a thermo-volumetric motor and relates particularly, though not exclusively, to a hydraulically driven thermo-volumetric motor. More particularly, the present invention relates to a hydraulically driven thermo-volumetric motor which exchanges heat with a phase change substance having a relatively high latent heat of fusion. The present invention further relates to a method for generating motion by using energy stored in the form of latent heat.

BACKGROUND OF THE INVENTION

There are a myriad of motors which are commercially available. The motors are usually driven by combustible fuels, electricity, solar energy, or a combination of any one or more of these sources of energy. Each energy source has its own drawbacks. For example, most combustible fuels when burnt produce gases which are harmful to the environment. Furthermore, if the fuel is not completely burnt the unburnt fuel can be exhausted and also adversely affect the environment.

Alternative sources of energy, such as photovoltaic generated electricity has been used for driving motors. Electricity in remote areas is somewhat restricted in that the storage of sufficient quantities of electrical energy in, for example, batteries takes up large amounts of space, is relatively expensive, and can also be extremely heavy. Solar energy is inherently restricted for at least the following reasons. Solar energy is only available during sunlight hours and may vary in intensity depending on the season of the year. Particularly cold areas of the world may never lend themselves to solar energy as an alternative energy supply. Furthermore, photovoltaic generated electricity is relatively expensive to produce.

When solar energy has been used as an energy source it is usually absorbed on a collector panel. The absorbed heat from the panel is then exchanged with a fluid, in the form of specific heat, and ultimately used in a variety of ways to drive a motor or generator. Relatively small quantities of energy can be stored in the form of specific heat and solar powered electric motors, for example, have relatively little power. Furthermore, solar energy when used to drive a motor or generator is limited by the cost of photovoltaic cells and storage batteries.

SUMMARY OF THE INVENTION

An intention of the present invention is to provide a thermo-volumetric motor which can operate relatively efficiently and environmentally safely.

According to a first aspect of the present invention there is provided a thermo-volumetric motor comprising:
- a continuous incompressible fluid path, adapted to carry a substantially incompressible fluid, said incompressible fluid path having pressure transfer means and actuating means in fluid communication with each other;
- a continuous compressible fluid path being adapted to carry a substantially compressible fluid, said compressible fluid path including heat transfer means in fluid communication with the pressure transfer means, the heat transfer means including a first phase change substance having a relatively high latent heat of fusion, and cooling means in fluid communication with the heat transfer means and the pressure transfer means whereby, in use, heat from a heat source can be absorbed by the first phase change substance so that at least a portion of the first phase fuses and thereafter when said portion of the first phase change substance solidifies and releases latent heat the compressible fluid can absorb said latent heat and expand, thus moving the pressure transfer means wherein the incompressible fluid is forced along the incompressible fluid path thus moving the actuating means which can be adapted to provide motive power, the cooling means thereafter cooling the compressible fluid after said compressible fluid is released from the pressure transfer means.

Preferably, the compressible continuous fluid path further comprises a pump operatively coupled to the actuating means and in fluid communication with the heat transfer means, the cooling means, and the pressure transfer means wherein movement of the actuating means drives the pump thereby pumping the compressible fluid through the compressible fluid path.

Typically, the thermo-volumetric motor further comprises a collector in heat conductive communication with the heat transfer means whereby, in use, heat absorbed by the collector from a heat source can be transferred to the first phase change substance included in the heat transfer means.

Preferably, the pressure transfer means comprises a piston slidably received in a cylinder defining a compressible fluid chamber on one side of the piston, said compressible fluid chamber adapted to receive the compressible fluid, and an incompressible fluid chamber on an opposite side of the piston, said incompressible fluid chamber adapted to receive incompressible fluid whereby, in use, expansion of the compressible fluid as effected by the heat transfer means can move the piston relative to the cylinder thereby forcing the incompressible fluid through the incompressible fluid path.

Preferably, the pressure transfer means comprises a first and a second piston each slidably received in a first and a second cylinder, respectively, defining a compressible fluid chamber on one side of the piston, said compressible fluid chamber adapted to receive the compressible fluid, and an incompressible fluid chamber on an opposite side of the piston, said incompressible fluid chamber adapted to receive the incompressible fluid whereby, in use, compressible fluid can be expanded into the compressible fluid chamber of the first cylinder wherein the first piston is moved relative to the first cylinder thereby forcing the incompressible fluid through the incompressible fluid path and moving the second piston relative to the second cylinder, and thereafter compressible fluid can be expanded into the compressible fluid chamber of the second cylinder.

Typically, the cooling means is a first accumulator containing a second phase change substance having a relatively high latent heat of fusion and a relatively low melting-point whereby, in use, heat from the compressible fluid can be absorbed by the second phase change substance thus cooling the compressible fluid passing through the cooling means.

In one embodiment, the thermo-volumetric motor further comprises a heat exchanger in fluid communication with both the actuating means and the cooling means whereby, in use, heat generated by the incompressible fluid when forced from the pressure transfer means can be transferred to the compressible fluid via the heat exchanger thus expanding the compressible fluid.

Alternatively, the heat transfer means further includes the heat exchanger so that heat generated by the incompressible fluid when forced from the pressure transfer means can be transferred to the compressible fluid via the first phase change substance included in the heat transfer means.

Typically, the collector is a solar collector adapted to absorb sunlight being the heat source. Alternatively the heat source may be a waste heat source.

In one example, the actuating means is a hydraulic motor. Typically, the heat transfer means comprises:
- a first tube adapted for carrying the compressible fluid through the heat transfer means; and
- a shell containing the first phase change substance said substance in heat conductive communication with the first tube whereby, in use, latent heat can be transferred from the first phase change substance to the compressible fluid via the first tube of the heat transfer means.

More typically, the heat transfer means further comprises a jacket surrounding the shell and adapted to carry a heat transfer fluid whereby, in use, heat from the heat transfer fluid can be transferred to the first phase change substance thereby melting the first phase change substance and storing latent heat.

In this embodiment, the jacket is in heat conductive communication with the collector wherein heat absorbed by the collector can be transferred to the first phase change substance via the heat transfer fluid.

In another embodiment the heat transfer means further comprises a second accumulator containing a third phase change substance, said second accumulator in heat conductive communication with the collector, wherein the heat transfer fluid can be preheated by the latent heat of the third phase change substance before said heat transfer fluid flows to the jacket.

According to a second aspect of the present invention there is provided a method for producing motive power comprising the steps of:
- absorbing heat, from a heat source, on a first phase change substance included in heat transfer means wherein at least a portion of the first phase change substance fuses, said first phase change substance having a relatively high latent heat of fusion;
- transferring latent heat from the first phase change substance, upon solidification thereof, to a compressible fluid thereby expanding the compressible fluid;
- releasing the expanded compressible fluid into pressure transfer means thus moving the pressure transfer means which then forces an incompressible fluid through an actuating means thus producing motive power from the actuating means; and
- cooling the compressible fluid and returning said compressible fluid in the heat transfer means.

Preferably, the method further comprises the step of driving a pump operatively coupled to the actuating means wherein the compressible fluid is pumped to the heat transfer means using the pump.

More typically, the method further comprises the step of absorbing heat from the heat source onto a collector, wherein the absorbed heat can be transferred to the first phase change substance of the heat transfer means.

Preferably, the step of cooling the compressible fluid involves absorbing heat from the compressible fluid by exchanging heat with a second phase change substance, having a relatively high latent heat of fusion and a relatively low melting-point, wherein the compressible fluid is cooled.

Typically, the method further comprises the step of transferring specific heat from the incompressible fluid, said specific heat generated when the incompressible fluid is forced from the pressure transfer means, to the compressible fluid via a heat exchanger.

Typically the first, second and/or third phase change substances are first, second and/or third hydrate salts, respectively, each having a relatively high latent heat of fusion.

More typically, the first hydrate salt and the third hydrate salt has a melting-point of between 0° C. to 100° C.

Preferably, the first hydrate salt and the third hydrate salt each has a latent heat of fusion of greater than 50 kilocalories/liter (kcal/l).

In one example, the first hydrate salt and/or the third hydrate salt comprises sodium acetate trihydrate or a derivative thereof.

Typically, the second hydrate salt has a melting-point of less than 0° C.

In one example, the second hydrate salt comprises a stoichiometric mixture of sodium chloride, calcium chloride, and demineralised water.

Typically, the incompressible fluid is a liquid hydrocarbon, such as oil or a derivative thereof.

Preferably, the compressible fluid is a refrigerant such as methane, chloro-difluoro or a derivative thereof.

More preferably, the refrigerant does not contain a halogen element.

BRIEF DESCRIPTION OF THE DRAWING

In order to achieve a better understanding of the nature of the present invention preferred embodiments of an apparatus and method relating to a thermo-volumetric motor will now be described in some detail, by way of example only, with reference to the accompanying drawing in which.

DETAILED DESCRIPTION OF PREFERRED EMBODIMENTS

Figure 1:
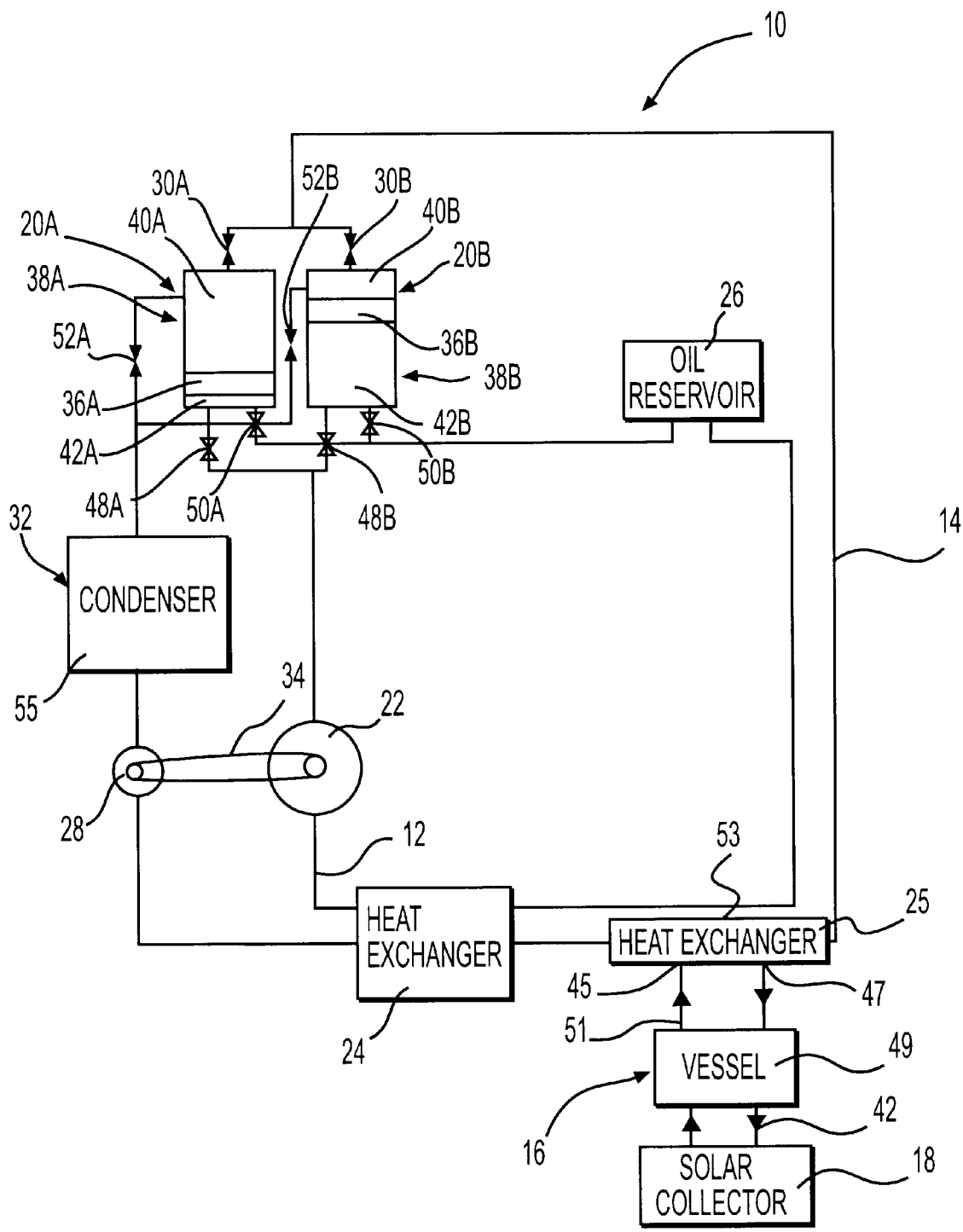
FIG. 1 is a schematic of a preferred embodiment of a thermo-volumetric motor.

As shown in FIG. 1, a thermo-volumetric motor 10 comprises: a continuous incompressible fluid path in the form of a hydraulic oil path 12, a continuous compressible fluid path in the form of a refrigerant path 14, and a solar collector 18. The hydraulic oil path 12 and refrigerant path 14 are adapted to carry a hydraulic oil and a refrigerant fluid, in this example methane chloro-difluoro or a derivative thereof, respectively. The solar collector 18 is adapted to absorb heat from a heat source, in this example sunlight.

The hydraulic oil path 12 includes pressure transfer means in this example a pair of hydraulic cylinders 20A, 20B located in a parallel flow arrangement. The oil path 12 further comprises actuating means, in this example a hydraulic motor 22, in fluid communication with a first heat exchanger 24. Downstream of the first heat exchanger 24, the oil path 12 further comprises an oil reservoir 26, located upstream of the hydraulic cylinders 20A, 20B. In this example, the oil reservoir has a capacity of approximately twenty (20) liters of hydraulic oil. The first heat exchanger 24 comprises a shell through which the oil flows, and a tube through which the refrigerant flows and absorbs heat from the oil.

The refrigerant path 14 comprises a pump 28 operatively coupled to the hydraulic motor 22, and heat transfer means, in this example a second heat exchanger 25. The refrigerant path further comprises an injector or first pair of solenoid actuated valves 30A,30B located upstream of the hydraulic cylinders 20A, 20B respectively and cooling means located downstream of the hydraulic cylinders 20A, 20B, in this example a first accumulator or condenser 32 used for cooling the refrigerant. The second heat exchanger 25 is located downstream of the condenser 32, the pump 28, and the first heat exchanger 24. The pump 28 is rotationally driven by the hydraulic motor 22 via an endless belt 34. Alternatively the pump 28 may be driven by the hydraulic motor 22 via a gear train. Each of the first solenoid actuated valves 30 has a downstream flow path connected to one of the hydraulic cylinders 20.

In this embodiment each of the hydraulic cylinders 20A, 20B comprises a piston 36A, 36B slidably received in a cylinder 38A, 38B, respectively. On one side of each of the pistons 36A, 36B there is a compressible fluid chamber 40A, 40B and on an opposite side of each of the pistons 36A, 36B there is an incompressible fluid chamber 42A, 42B. The compressible fluid and incompressible fluid chambers 40, 42 are each adapted to carry the refrigerant and the hydraulic oil, respectively.

The second heat exchanger 25 comprises a shell and tube arrangement (not shown) wherein the refrigerant is passed through a first tube formed in the shape of a triple-helix. The shell contains a first phase change substance, in this example a first hydrate salt comprising sodium acetate trihydrate, having a high latent heat of fusion and a melting-point of approximately 58° C. The second heat exchanger 25 is housed in a sealed jacket 53 surrounding the shell and adapted to carry a heat transfer fluid, in this example water. The jacket 53 has an inlet 45 for receiving water and an outlet 47 for discharging water.

The heat transfer means further includes a second accumulator 16 containing a third phase change substance having a relatively high latent heat of fusion. The third phase change substance is contained in a vessel 49, the vessel 49 housing a tube 51 used to recirculate water flowing through the jacket 53 of the second heat exchanger 25. An electrically powered fluid transfer pump (not shown) is used to recirculate water through the second heat exchanger 25. In this example, the third phase change substance comprises a third hydrate salt sodium acetate trihydrate having a melting point of approximately 58° C. The second accumulator 16 can take a variety of configurations and may contain any selected phase change substance largely depending on the boiling-point of the refrigerant used.

The solar collector 18 can also take a variety of forms and configurations. Essentially the solar collector 18 comprises an upper surface (not shown) exposed to sunlight, the upper surface constructed of a material having a relatively low reflectivity and radiation. In this embodiment the upper surface is coated with a coating of IMPERSPRAY. IMPERSPRAY is a trade mark for a composite bitumen/latex product. The collector 18 has a base layer constructed of a high density polystyrene material having relatively high thermal insulation. The coating of IMPERSPRAY covers an upper surface of the base layer. A corrugated sheet constructed of a polycarbonate material, being substantially transparent to sunlight, rests on the coating of IMPERSPRAY. A series of adjacent channels are thus defined between a lower surface of the corrugated sheet and the coasting of IMPERSPRAY. It is believed that a greenhouse heating effect occurs in the adjacent channels such that the efficiency of the collector 18 is increased.

Water, in this example being the heat transfer fluid, is used to transfer waste heat, absorbed on the collector 18, to the second accumulator 16. The water is carried through the recirculation tube 42 laid in a serpentine arrangement within the base layer underneath the coating of IMPERSPRAY. In this example, heat from the solar collector 18 is transferred to the third hydrate salt contained in the second accumulator 16 via the water flowing through the recirculation tube 42. The first hydrate salt contained in the second heat exchanger 25 is then heated via the water recirculating between the second accumulator 16 and the jacket 53 of the second heat exchanger 25.

Each of the first solenoid actuated valves 30A, 30B is designed to alternately supply refrigerant to each of the hydraulic cylinders 20. The refrigerant is released into the compressible chamber 40A, 40B of each cylinder 20A, 20B.

The condenser 32 can also take a variety of forms. In this example, the condenser 32 comprises a refrigerant tube (not shown) formed in the shape of a helix in the condenser 32, the tube housed in a shell 55. The shell 55 contains a second phase change substance, in this embodiment a second hydrate salt, having a relatively high latent heat of fusion and a relatively low melting-point. The shell is jacketed with a suitable heat-insulation material. In this example the second hydrate salt comprises a stoichiometric mixture of sodium chloride, calcium chloride and demineralised water, having a melting point of approximately −21° C.

The pump 28 of this embodiment is a positive displacement pump comprising a series of gears used for generating a flow of refrigerant to the second heat exchanger 25. The pump 28 in operation is driven by the hydraulic motor 22 via the endless belt 34.

As further shown in FIG. 1, each of the components of the oil 12 and refrigerant 14 paths are connected so that a continuous flow path is provided for the hydraulic oil and the refrigerant, respectively. Suitable tubing, couplings, and other attachments are used to connect the components.

Located downstream of the incompressible fluid chamber 42A, 42B of each hydraulic cylinder 20A, 20B there is a downstream non-return valve 48 included in the hydraulic oil path 12. Located upstream of each of the incompressible fluid chambers 42A, 42B there is an upstream non-return valve 50 included in the hydraulic oil path 12. Downstream of the compressible fluid chamber 40A, 40B of each hydraulic cylinder 20A, 20B there is a second pair of solenoid actuated valves 52A, 52B included in the refrigerant path 14.

Operation of the thermo-volumetric motor 10 described above will now be explained in some detail, by way of example only. Sunlight being a heat source can be absorbed on the upper surface of the solar collector 18. Heat is then transferred from the solar collector 18 to the second accumulator 16 via water, being the heat transfer fluid in this example. The third hydrate salt, having a melting-point of approximately 58° C. contained in the vessel 49 of the second accumulator 16 is heated wherein at least a portion of said salt fuses and stores energy in the form of latent heat. Thereafter water recirculating between the second accumulator 16 and the jacket of the second heat exchanger 25 cools and solidifies a fraction of the third hydrate salt and is thus heated by the latent heat of fusion of the third hydrate salt. The heated water then exchanges heat with the first hydrate salt contained in the second heat exchanger 25 thereby fusing at least a portion of this hydrate salt.

The refrigerant flowing through the first tube of the second heat exchanger 25 causes the first hydrate salt to solidify thus releasing its latent heat of fusion. The hydraulic oil flowing through the shell of the first heat exchanger 24 can also exchange heat, in the form of specific heat, with the refrigerant thus preheating the refrigerant before it flows to the second heat exchanger 25. Advantageously this reduces the heat required to be absorbed by the refrigerant from the first hydrate salt in order to effect vaporisation of the refrigerant.

The refrigerant when heated by the first hydrate salt expands, preferably vaporising, and flows to the first solenoid actuated valves 30A, 30B. One of the first valves 30A then opens and releases pressurised refrigerant into the compressible fluid chamber 40A of one of the hydraulic cylinders 20A. The second solenoid actuated valve 52A is closed when the first valve 30A is opened. The other of the first solenoid actuated valves 30B is also closed.

The refrigerant then moves the piston 36A in a downward direction (as shown in FIG. 1) thereby driving the hydraulic oil contained in the incompressible fluid chamber 42A out of the cylinder 20A. The hydraulic oil then drives the hydraulic motor 22 which is coupled to and rotates the positive displacement pump 28 of the refrigerant path 14. The oil when forced out of the hydraulic cylinder 20A and through the downstream non-return valve 48 is heated and passes through the shell of the first heat exchanger 24. The oil can then transfer heat, in the form of specific heat, to the refrigerant flowing through the tube of the heat exchanger 24. The volume ratio of oil contained in the incompressible fluid chamber 42 when the piston 36 is moved from a top dead centre position to a bottom dead centre position is approximately 7 to 1.

The second solenoid actuated valve 52A is opened once the piston 36A has moved a full stroke in the cylinder 38A and the oil forced from the incompressible fluid chamber 42A. Oil flows to the incompressible fluid chamber 42B of the other hydraulic cylinder 20B via the upstream non-return valve 50B. The piston 36B is then forced by the hydraulic oil in an upward direction (as shown in FIG. 1). When the piston 36B is at the top of its stroke, the first solenoid valve 30B is opened with the second solenoid valve 52B closed wherein refrigerant is released into the compressible fluid chamber 40B thus forcing oil from the incompressible fluid chamber 42B through the downstream non-return valve 48B. The flow of oil through the oil path 12, as a result of the alternate reciprocation of each piston 36, drives the hydraulic motor 22 which can the be used to provide motive power.

The opening and closing of the first and second valves 30, 52 respectively can be controlled so that reciprocation of the pistons 36 can be varied and thus timing of the motor 10 controlled. The motive power can then, for example, be used to drive a generator thereby producing electricity.

The positive displacement pump 28 when driven by the hydraulic motor 22 pumps refrigerant to the first and second heat exchangers 24, 25 and the first solenoid actuated valves 30. The refrigerant when exhausted from the compressible fluid chamber 40 of each of the hydraulic cylinders 20 flows to the condenser 32. In this example, the second hydrate salt comprises a stoichiometric mixture of sodium chloride, calcium chloride, and demineralised water, having a melting-point of approximately −21° C. This is preferably less than the average temperature of the refrigerant when exhausted from each hydraulic cylinder 20A, 20B. The second hydrate salt thereby absorbs heat from the refrigerant in the form of latent heat as it passes through the condenser 32. The refrigerant thereby cools and preferably condenses before being pumped downstream by the positive displacement pump 28.

It will now be apparent to persons skilled in the relevant arts that the present invention has at least the following advantages over the admitted prior art:
1) Solar energy or waste heat can be used to efficiently drive a thermo-volumetric motor using a phase change substance having a relatively high latent heat of fusion;
2) A thermo-volumetric motor according to the present invention is relatively efficient when compared to, for example, a solar powered electric motor;
3) The thermo-volumetric motor has no deleterious exhaust products and is relatively environmentally safe; and
4) The thermo-volumetric motor uses energy such as solar energy which is generally not a limited resource as, for example, is the case with mineral fuels.

It will be apparent to persons skilled in the relevant arts that numerous variations and modifications can be made to the apparatus and method relating to a thermo-volumetric motor in addition to those already mentioned above without departing from the spirit and basic inventive concepts of the present invention. For example, the heat transfer means may be heated by some other heat source other than solar energy as described herein. For example, waste heat from a process stream may intermittently supply heat to the first phase change substance to effect storage of latent heat. The heat transfer means and/or the cooling means may contain a different phase change substance to that described and may in fact comprise banks of various phase change substances, each with a different melting-point. The heat transfer means is not limited to the shell and tube type heat exchanger described herein. Furthermore, the pump, hydraulic motor and injector described may take various forms, each form essentially performing the same function, and thus remain within the scope of the present invention. The condenser may not be activated by a second phase change substance but may include some other cooling medium. The hydraulic oil or incompressible fluid may not exchange heat with the refrigerant or compressible fluid as described herein. The thermo-volumetric motor does not require a second accumulator as herein described but may rely solely on the first phase change substance contained in the heat transfer means for the storage of latent heat. Preferably the compressible fluid is not a halogenated hydrocarbon as herein described. All such variations and modifications are to be considered within the scope of the present invention the nature of which is to be determined from the foregoing description.

We claim:

1. A thermo-volumetric motor comprising:
a continuous incompressible fluid path, adapted to carry a substantially incompressible fluid, said incompressible fluid path having pressure transfer means and actuating means in fluid communication with each other;
a continuous compressible fluid path being adapted to carry a substantially compressible fluid, said compressible fluid path including heat transfer means in fluid communication with the pressure transfer means, the heat transfer means including a first phase change substance having a relatively high latent heat of fusion, and cooling means in fluid communication with the heat transfer means and the pressure transfer means whereby, in use, heat from a heat source can be absorbed by the first phase change substance so that at least a portion of the first phase change fuses and thereafter when said portion of the first phase change substance solidifies and releases latent heat the compressible fluid can absorb said latent heat and expand, thus moving the pressure transfer means wherein the incompressible fluid is forced along the incompressible fluid path thus moving the actuating means which can be adapted to provide motive power, the cooling means thereafter cooling the compressible fluid after said compressible fluid is released from the pressure transfer means.

2. A thermo-volumetric motor as defined in claim 1 wherein the compressible continuous fluid path further comprises a pump operatively coupled to the actuating means and in fluid communication with the heat transfer means, the cooling means, and the pressure transfer means wherein movement of the actuating means drives the pump thereby pumping the compressible fluid through the compressible fluid path.

3. A thermo-volumetric motor as defined in claim 1 wherein the thermo-volumetric motor further comprises a collector in heat conductive communication with the heat transfer means whereby, in use, heat absorbed by the collector from a heat source can be transferred to the first phase change substance included in the heat transfer means.

4. A thermo-volumetric motor as defined in claim 1 wherein the pressure transfer means comprises a piston slidably received in a cylinder defining a compressible fluid chamber on one side of the piston, said compressible fluid chamber adapted to receive the compressible fluid, and an incompressible fluid chamber on an opposite side of the piston, said incompressible fluid chamber adapted to receive incompressible fluid whereby, in use, expansion of the compressible fluid as effected by the heat transfer means can move the piston relative to the cylinder thereby forcing the incompressible fluid through the incompressible fluid path.

5. A thermo-volumetric motor as defined in claim 1 wherein the pressure transfer means comprises a first and a second piston each slidably received in a first and a second cylinder, respectively, defining a compressible fluid chamber on one side of the piston, said compressible fluid chamber adapted to receive the compressible fluid, and an incompressible fluid chamber on an opposite side of the piston, said incompressible fluid chamber adapted to receive the incompressible fluid whereby, in use, compressible fluid can be expanded into the compressible fluid chamber of the first cylinder wherein the first piston is moved relative to the first cylinder thereby forcing the incompressible fluid through the incompressible fluid path and moving the second piston relative to the second cylinder, and thereafter compressible fluid can be expanded into the compressible fluid chamber of the second cylinder.

6. A thermo-volumetric motor as defined in claim 1 wherein the cooling means is a first accumulator containing a second phase change substance having a relatively high latent heat of fusion and a relatively low melting-point whereby, in use, heat from the compressible fluid can be absorbed by the second phase change substance thus cooling the compressible fluid passing through the cooling means.

7. A thermo-volumetric motor as defined in claim 1 further comprising a heat exchanger in fluid communication with both the actuating means and the cooling means whereby, in use, heat generated by the incompressible fluid when forced from the pressure transfer means can be transferred to the compressible fluid via the heat exchanger thus expanding the compressible fluid.

8. A thermo-volumetric motor as defined in claim 7 wherein the heat transfer means further includes the heat exchanger so that heat generated by the incompressible fluid when forced from the pressure transfer means can be transferred to the compressible fluid via the first phase change substance included in the heat transfer means.

9. A thermo-volumetric motor as defined in claim 3 wherein the collector is a solar collector adapted to absorb sunlight being the heat source.

10. A thermo-volumetric motor as defined in claim 1 wherein the actuating means is a hydraulic motor.

11. A thermo-volumetric motor as defined in claim 1 wherein the heat transfer means comprises:
  a first tube adapted for carrying the compressible fluid through the heat transfer means; and
  a shell containing the first phase change substance said substance in, heat conductive communication with the first tube whereby, in use, latent heat can be transferred from the first phase change substance to the compressible fluid via the first tube of the heat transfer means.

12. A thermo-volumetric motor as defined in claim 11 wherein the heat transfer means further comprises a jacket surrounding the shell and adapted to carry a heat transfer fluid whereby, in use, heat from the heat transfer fluid can be transferred to the first phase change substance thereby melting the first phase change substance and storing latent heat.

13. A thermo-volumetric motor as defined in claim 12 wherein the motor further comprises a collector in heat conductive communication with the heat transfer means and wherein the jacket is in heat conductive communication with the collector wherein heat absorbed by the collector can be transferred to the first phase change substance via the heat transfer fluid.

14. A thermo-volumetric motor as defined in claim 13 wherein the heat transfer means further comprises a second accumulator containing a third phase change substance, said second accumulator in heat conductive communication with the collector, wherein the heat transfer fluid can be preheated by the latent heat of the third phase change substance before said heat transfer fluid flows to the jacket.

15. A method for producing motive power comprising the steps of:
  absorbing heat, from a heat source, on a first phase change substance included in heat transfer means wherein at least a portion of the first phase change substance fuses, said first phase change substance having a relatively high latent heat of fusion;
  transferring latent heat from the first phase change substance, upon solidification thereof, to a compressible fluid thereby expanding the compressible fluid;
  releasing the expanded compressible fluid into pressure transfer means thus moving the pressure transfer means which then forces an incompressible fluid through an actuating means thus producing motive power from the actuating means; and
  cooling the compressible fluid and returning said compressible fluid to the heat transfer means.

16. A method for producing motive power as defined in claim 15 further comprising the step of driving a pump operatively coupled to the actuating means wherein the compressible fluid is pumped to the heat transfer means using the pump.

17. A method for producing motive power as defined in claim 15 further comprising the step of absorbing heat from the heat source onto a collector, wherein the absorbed heat can be transferred to the first phase change substance of the heat transfer means.

18. A method for producing motive power as defined in claim 15 wherein the step of cooling the compressible fluid involves absorbing heat from the compressible fluid by exchanging heat with a second phase change substance, having a relatively high latent heat of fusion and a relatively low melting-point, wherein the compressible fluid is cooled.

19. A method for producing motive power as defined in claim 15 further comprising the step of transferring specific heat from the incompressible fluid, said specific heat generated when the incompressible fluid is forced from the pressure transfer means, to the compressible fluid via a heat exchanger.

20. A thermo-volumetric motor as defined in claim 1 wherein the first, second and/or third phase change substances are first, second and/or third hydrate salts, respectively, each having a relatively high latent heat of fusion.

21. A thermo-volumetric motor as defined in claim 20 wherein the first hydrate salt and the third hydrate salt has a melting-point of between 0° C. to 100° C.

22. A thermo-volumetric motor or a method for producing motive power as defined in claim 20 wherein the first hydrate salt and the third hydrate salt each has a latent heat of fusion of greater than 50 kilocalories/liter (kcal/l).

23. A thermo-volumetric motor as defined in claim 20 wherein the first hydrate salt and/or the third hydrate salt comprises sodium acetate trihydrate or a derivative thereof.

24. A thermo-volumetric motor as defined in claim 20 wherein the second hydrate salt has a melting-point of less than 0° C.

25. A thermo-volumetric motor as defined in claim 20 wherein the second hydrate salt comprises a stoichiometric mixture of sodium chloride, calcium chloride, and demineralised water.

26. A thermo-volumetric motor as defined in claim 1 wherein the incompressible fluid is a liquid hydrocarbon, such as oil or a derivative thereof.

27. A thermo-volumetric motor as defined in claim 1 wherein the compressible fluid is a refrigerant such as methane, chloro-difluoro or a derivative thereof.

28. A thermo-volumetric motor as defined in claim 27 wherein the refrigerant does not contain a halogen element.

* * * * *